(12) United States Patent
Beckham

(10) Patent No.: US 10,053,584 B1
(45) Date of Patent: Aug. 21, 2018

(54) BIOLOGICAL, WATER INSOLUBLE COATING DELIVERY SYSTEM FOR CAPSAICIN AND OTHER MACROFOULING INHIBITORS

(71) Applicant: Lewis Steven Beckham, Cortez, FL (US)

(72) Inventor: Lewis Steven Beckham, Cortez, FL (US)

( * ) Notice: Subject to any disclaimer, the term of this patent is extended or adjusted under 35 U.S.C. 154(b) by 0 days.

(21) Appl. No.: 15/615,117

(22) Filed: Jun. 6, 2017

Related U.S. Application Data

(60) Provisional application No. 62/392,529, filed on Jun. 6, 2016.

(51) Int. Cl.
*C09D 5/16* (2006.01)
*C09D 191/06* (2006.01)

(52) U.S. Cl.
CPC .......... *C09D 5/1625* (2013.01); *C09D 191/06* (2013.01)

(58) Field of Classification Search
CPC ............................ C09D 5/1625; C09D 191/06
See application file for complete search history.

(56) References Cited

U.S. PATENT DOCUMENTS

| | | | | |
|---|---|---|---|---|
| 5,226,380 A | * | 7/1993 | Fischer | B63B 59/04 114/222 |
| 5,397,385 A | * | 3/1995 | Watts | C09D 5/1625 106/15.05 |
| 5,629,045 A | * | 5/1997 | Veech | A01N 37/18 106/15.05 |
| 5,985,010 A | * | 11/1999 | Etscorn | A01N 65/38 106/2 |
| 9,414,603 B2 | * | 8/2016 | Messina | A01N 25/00 |
| 9,572,348 B2 | * | 2/2017 | Messina | A01N 25/00 |

FOREIGN PATENT DOCUMENTS

| | | | | |
|---|---|---|---|---|
| EP | 1161937 A2 | * | 12/2001 | A61K 8/02 |
| FR | 2190892 A | * | 3/1974 | A01N 37/18 |
| WO | WO-2005027642 A1 | * | 3/2005 | A01N 37/18 |

* cited by examiner

*Primary Examiner* — Anthony J Green
(74) *Attorney, Agent, or Firm* — Allen Dyer Doppelt & Gilchrist, PA

(57) ABSTRACT

A blend of capsaicin or other active ingredients, beeswax and a solid hydrogenated vegetable tri-glyceride is used to produce a crayon-like delivery system that is rubbed on an underwater surface to produce a durable coating that inhibits fouling.

6 Claims, No Drawings

BIOLOGICAL, WATER INSOLUBLE COATING DELIVERY SYSTEM FOR CAPSAICIN AND OTHER MACROFOULING INHIBITORS

CROSS-REFERENCE TO RELATED APPLICATION

This application claims the benefit of U.S. Provisional Patent Application Ser. No. 62/392,529, filed on Jun. 6, 2016, the contents of which are herein incorporated by reference in their entirety.

FIELD OF THE INVENTION

The present invention relates generally to a method and system for producing a durable, water insoluble coating. More specifically, the present invention is a method and system for an underwater applied macrofouling inhibition system produced from biological materials that produces a durable, water insoluble coating that prevents barnacle and *Dreissena* mussel attachment to underwater surfaces.

BACKGROUND OF THE INVENTION

Natural capsaicin is derived from peppers in the genus *Capsicum*. Ground dried peppers containing capsaicin, extracted capsaicin and synthetic capsaicin have all been used as additives in paint applied to the bottoms of boats and ships for the prevention of barnacle growth on those boats and ships. It is therefore an object of the present invention to introduce an effective and efficient method and system for an underwater applied macrofouling inhibition product that produces a durable, water insoluble coating that prevents barnacle and *Dreissena* mussel attachment to underwater surfaces.

Fischer, U.S. Pat. No. 5,226,380, Jul. 13, 1993; Watts, U.S. Pat. No. 5,397,385, Mar. 14, 1995 and Veech, U.S. Pat. No. 5,629,045 May 13, 1997 all used capsaicin in one or more forms as additives to paints and other coatings for application to the bottoms of boats and ships for prevention of barnacle growth. A master thesis, "Evaluating the Potential of Zosteric Acid and Capsaicin For the Use As Natural Product Antifoulants" by Qingwei Xu, Dec., 2004 from The Ohio State University gave an extensive bibliography and background on the use and efficacy of capsaicin for prevention of barnacle growth.

In 1997 W. Gregory Cope, Michelle R. Bartsch and Leif L. Marking of the U.S. Geological Survey published "Efficacy of Candidate Chemicals for Preventing Attachment of Zebra Mussels (*Dreissena polymorpha*)" with results from testing 47 chemicals for prevention of Zebra mussel attachment. Capsaicin was identified as an efficacious product for preventing attachment with few environmental side effects.

Eade, WO 2005/027642 A1 envisioned using capsaicin with a natural wax, preferably lanolin, with a solvent for application to timbers or as a paint additive.

Herzog, EP1967555 A1 described a similar system producing a mixture that would be liquid at room temperature for applying an anti-foulant to the bottoms of vessels while out of the water.

Other products on the market are Prop Glop by Moby-Cool.com and Proparmor. Both are a combination of capsaicin and lanolin and designed to be applied underwater or out of the water. Their major drawback is lack of durability. Being of a soft grease-like composition they wear off moving propellers easily.

DESCRIPTION OF THE INVENTION

The present invention is a unique blend of pharmaceutical grade capsaicin or other active ingredients, beeswax and a solid hydrogenated vegetable tri-glyceride for producing a crayon-like delivery system that is rubbed on an underwater surface to produce a durable coating that prevents barnacle growth. Preferred percentages of the beeswax and solid hydrogenated vegetable triglyceride range between 45 and 55 percent each. The primary active ingredient, capsaicin, inhibits barnacles and *Dreissena* mussels from attaching to an underwater surface.

The melting points of the ingredients range between 47 and 65 degrees centigrade. The ingredients are blended together while in a molten state producing a uniform mixture. The molten blend is poured into molds or applicator which cools and hardens producing a water insoluble crayon-like product. The hardened crayon is rubbed on the underwater surface that has been scraped clean of existing barnacles or *Dreissena* mussels to produce a complete coverage of said surface. The resulting coating is durable and inhibits the underwater attachment of new macrofouling organisms such as barnacles and *Dreissena* mussels. The coating is designed to be essentially insoluble in water preventing the release of capsaicin or other active ingredient into the underwater environment.

Although the invention has been explained in relation to its preferred embodiment, it is to be understood that many other possible modifications and variations can be made without departing from the spirit and scope of the invention as herein described.

Aspects of the invention include:
1. A crayon-like product composed of Capsaicin (natural, synthetic or combination), beeswax and a hydrogenated vegetable triglyceride creating a delivery system for capsaicin and other anti-foulant active ingredients which;
2. Prevents macrofouling organisms such as barnacles and *Dreissena* mussels from attaching and growing on underwater boat parts and other underwater structures and surfaces such as water intakes;
3. May be applied underwater;
4. Adheres to underwater surfaces;
5. Adheres to propellers and boat rudders when underway;
6. Does not dissolve in water;
7. May be applied over existing bottom paint or coatings.
8. A system utilizing beeswax and hydrogenated vegetable triglyceride producing a crayon-like delivery system which may be mixed with other organic and inorganic anti-macrofoulants for reducing the solubility of said anti-macrofoulants into the environment after underwater application.

What is claimed is:
1. An anti-fouling crayon comprising a blend of:
capsaicin;
a wax; and
a triglyceride;
wherein the crayon is water insoluble.
2. The crayon of claim 1, wherein the wax is beeswax.
3. The crayon of claim 1, wherein the triglyceride is a hydrogenated vegetable triglyceride.
4. The crayon of claim 1, wherein the wax and triglyceride each constitute 45-55 percent of the crayon.
5. A method of preventing fouling of a marine surface using the crayon of claim 1, the method comprising:
rubbing the crayon onto the marine surface such that a layer of the blend of crayon materials is applied thereto.

6. The method of claim 5, wherein the rubbing step is performed underwater.

\* \* \* \* \*